(12) United States Patent
Shin et al.

(10) Patent No.: US 8,693,394 B2
(45) Date of Patent: Apr. 8, 2014

(54) APPARATUS AND METHOD OF DISCOVERING NEIGHBOR CELL

(75) Inventors: Eun Jeong Shin, Daejeon (KR); Hyeong Geun Park, Daejeon (KR); Il Gyu Kim, Okcheon-gun (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 748 days.

(21) Appl. No.: 12/542,933

(22) Filed: Aug. 18, 2009

(65) Prior Publication Data

US 2010/0074199 A1  Mar. 25, 2010

(30) Foreign Application Priority Data

Sep. 22, 2008 (KR) .................. 10-2008-0092632
Nov. 24, 2008 (KR) .................. 10-2008-0116933

(51) Int. Cl.
*H04J 11/00* (2006.01)

(52) U.S. Cl.
CPC ......... *H04J 11/0093* (2013.01); *H04J 11/0083* (2013.01); *H04J 11/0069* (2013.01); *H04J 11/0023* (2013.01); *H04J 11/005* (2013.01)
USPC ...................................................... 370/328

(58) Field of Classification Search
CPC ... H04J 11/004; H04J 11/005; H04J 11/0056; H04J 11/0059; H04J 11/0069; H04J 11/0073; H04J 11/0076; H04J 11/0079; H04J 11/0093; H04L 25/0328; H04L 25/03254; H04L 25/03305; H04L 25/005; H04L 5/0007
USPC ...................................................... 370/329
See application file for complete search history.

(56) References Cited

U.S. PATENT DOCUMENTS

| | | | |
|---|---|---|---|
| 6,041,235 A | 3/2000 | Aalto | |
| 7,324,479 B2 | 1/2008 | Hur | |
| 7,369,534 B2 | 5/2008 | Amerga et al. | |

FOREIGN PATENT DOCUMENTS

| | | |
|---|---|---|
| EP | 1513364 A2 | 3/2005 |
| JP | 2002-159035 | 5/2002 |
| KR | 10-0365786 B1 | 12/2002 |

(Continued)

OTHER PUBLICATIONS

NTT DoCoMo "SCH Structure and Cell Search method for E-UTRA Downlink" 3GPP TSG RAN WG1 Meeting #45, R1-061186, May 8-12, 2006, entire document.*

(Continued)

*Primary Examiner* — Joseph Bednash
(74) *Attorney, Agent, or Firm* — Kile Park Reed & Houtteman PLLC

(57) ABSTRACT

A method of discovering a neighbor cell, the method including: determining whether a first Primary Synchronization Channel (PSCH) of a first cell in which a terminal is included is identical to a second PSCH of a second cell, and whether timings of the first cell and the second cell are synchronous; estimating third channel information of the second cell based on second channel information of the first cell from first channel information, when the first PSCH is identical to the second PSCH and the timings of the first cell and the second cell are synchronous, the second channel information being estimated using a first Secondary Synchronization Channel (SSCH) of the first cell, and the first channel information being estimated using the first PSCH and the second PSCH; and detecting a second SSCH of the second cell, and detecting a cell identifier (ID) of the second cell using the second SSCH.

11 Claims, 3 Drawing Sheets

(56) References Cited

FOREIGN PATENT DOCUMENTS

| KR | 10-2005-0063423 A | | 6/2005 | |
|----|-------------------|---|--------|---|
| KR | 10-2005-0091097 A | | 9/2005 | |
| KR | 10-2008-0049894 A | | 6/2008 | |
| WO | 2008-042865 A3 | | 4/2008 | |
| WO | WO 2008/042865 | * | 4/2008 | .............. H04W 4/00 |

OTHER PUBLICATIONS

NTT DoCoMo et al. "Comparison on Cell Search Time Performance between SCH-replica based and Auto-Correlation Based Detections in EUTRA Downlink" R1-061187, May 8-12, 2006, entire document.*

Siemens, "Interference minimization and cancellation techniques for MIMO systems", R1-061899, 3GPP TSG RAN WG1 LTE ad hoc, Cannes, France Jun. 27-30, 2006.*

IPWireless, "Intercell Interference Cancellation for E-UTRA", R1-061894, 3GPP TSG RAN WG1 LTE ad hoc, Cannes, France Jun. 27-30, 2006.*

G. Il Gyu Kim et al. Neighbor Cell Search Scheme using Partial Interference Cancellation of Primary Synchronization Code (CIC 2000, vol. 2, p. 206~210).

Satochi Nagata et al., "Investigations of Synchronization Channel Sequences in OFDM Based Evolved UTRA Downlink", Vehicular Technology Conference, 2007. VTC-2007 Fall. 2007 IEEE 66th, IEEE, PI, Sep. 1, 2007, pp. 1390-1395.

European Search Report dated Jan. 29, 2010, issued in European patent appl. No. 09166587.7.

* cited by examiner

APPARATUS AND METHOD OF DISCOVERING NEIGHBOR CELL

This application claims priority to Korean Patent Application No. 10-2008-0092632, filed on Sep. 22, 2008, and Korean Patent Application No. 10-2008-0116933, filed on Nov. 24, 2008 and all the benefits accruing therefrom under 35 U.S.C. §119, the contents of which in its entirety are herein incorporated by reference.

BACKGROUND OF THE INVENTION

1. Field of the Invention

The present invention relates to an apparatus and method of discovering a neighbor cell, and more particularly, to an apparatus and method of discovering a neighbor cell which may accurately retrieve a neighbor cell when a primary synchronization channel (PSCH) of a cell where a terminal is included is identical to a PSCH of the neighbor cell, and timings of the cell and the neighbor cell are synchronous.

2. Description of Related Art

In a $3^{rd}$ Generation Partnership Project (3GPP) Long Term Evolution (LTE) system, a base station may not receive information about neighbor cells unlike an existing Wideband Code Division Multiple Access (WCDMA) system. Accordingly, a terminal may not receive information about a neighbor cell from the base station, and a high detection rate of neighbor cells and a real-time process for neighbor cell retrieval are required so that the terminal performs a fast handover.

In general, in a 3GPP LTE system, 504 cell identifiers (IDs) may be configured as three primary synchronization channels (PSCHs) and 168 secondary synchronization channels (SSCHs). A PSCH symbol may be used to obtain a cell identifier, and to achieve symbol synchronization between a base station and a terminal. Also, an SSCH symbol may be used to estimate a cell ID of the base station and to achieve radio frame synchronization between the terminal and the base station.

Accordingly, when the terminal performs a handover to a neighbor cell, the terminal is required to estimate information about a neighbor cell using the PSCH and the SSCH.

In general, a terminal may estimate and compensate channel information about a neighbor cell using a PSCH, and detect a cell ID of the neighbor cell using an SSCH.

However, when a PSCH of a cell where a terminal is currently included is identical to a PSCH of a neighbor cell, and timings are synchronous, the terminal may be prevented from discovering the neighbor cell due to the PSCH of the cell where the terminal is included.

Thus, a technology which enables a probability that a terminal retrieves a neighbor cell to increase based on a variety of situations that may occur when the terminal retrieves the neighbor cell is required.

BRIEF SUMMARY OF THE INVENTION

An exemplary embodiment of the present invention provides an apparatus and method of discovering a neighbor cell which, when a primary synchronization channel (PSCH of a cell where a terminal is included and a PSCH of a neighbor cell are identical and timings are synchronous, may remove a noise or interference that may occur when the terminal retrieves the neighbor cell, and thereby may increase a probability the terminal retrieves the neighbor cell.

According to an exemplary embodiment of the present invention, there is provided a method of discovering a neighbor cell, the method including: determining whether a first Primary Synchronization Channel (PSCH) of a first cell in which a terminal is included is identical to a second PSCH of a second cell, and whether timings of the first cell and the second cell are synchronous; estimating third channel information of the second cell based on second channel information of the first cell from first channel information, when the first PSCH is identical to the second PSCH and the timings of the first cell and the second cell are synchronous, the second channel information being estimated using a first Secondary Synchronization Channel (SSCH) of the first cell, and the first channel information being estimated using the first PSCH and the second PSCH; and detecting a second SSCH of the second cell using the third channel information, and detecting a cell identifier (ID) of the second cell using the second SSCH.

According to an exemplary embodiment of the present invention, there is provided an apparatus of discovering a neighbor cell, the apparatus including, a determination unit to determine whether a first PSCH of a first cell in which a terminal is included is identical to a second PSCH of a second cell, and whether timings of the first cell and the second cell are synchronous; a channel estimation unit to estimate third channel information of the second cell based on second channel information of the first cell from first channel information, when the first PSCH is identical to the second PSCH and the timings of the first cell and the second cell are synchronous, the second channel information being estimated using a first SSCH of the first cell, and the first channel information being estimated using the first PSCH and the second PSCH; and a detection unit to detect a second SSCH of the second cell using the third channel information, and detect a cell ID of the second cell using the second SSCH.

According to an exemplary embodiment of the present invention, when a primary synchronization channel (PSCH) of a cell where a terminal is included and a PSCH of a neighbor cell are identical and timings are synchronous, an apparatus and method of discovering a neighbor cell may remove a noise or interference that may occur when the terminal retrieves the neighbor cell, and thereby may increase a probability a terminal retrieves a neighbor cell.

BRIEF DESCRIPTION OF THE DRAWINGS

The above and/or other aspects, features and advantages of the present invention will now become apparent and more readily appreciated from the following description of exemplary embodiments, taken in conjunction with the accompanying drawings, in which.

DETAILED DESCRIPTION OF EMBODIMENTS

Figure 1:
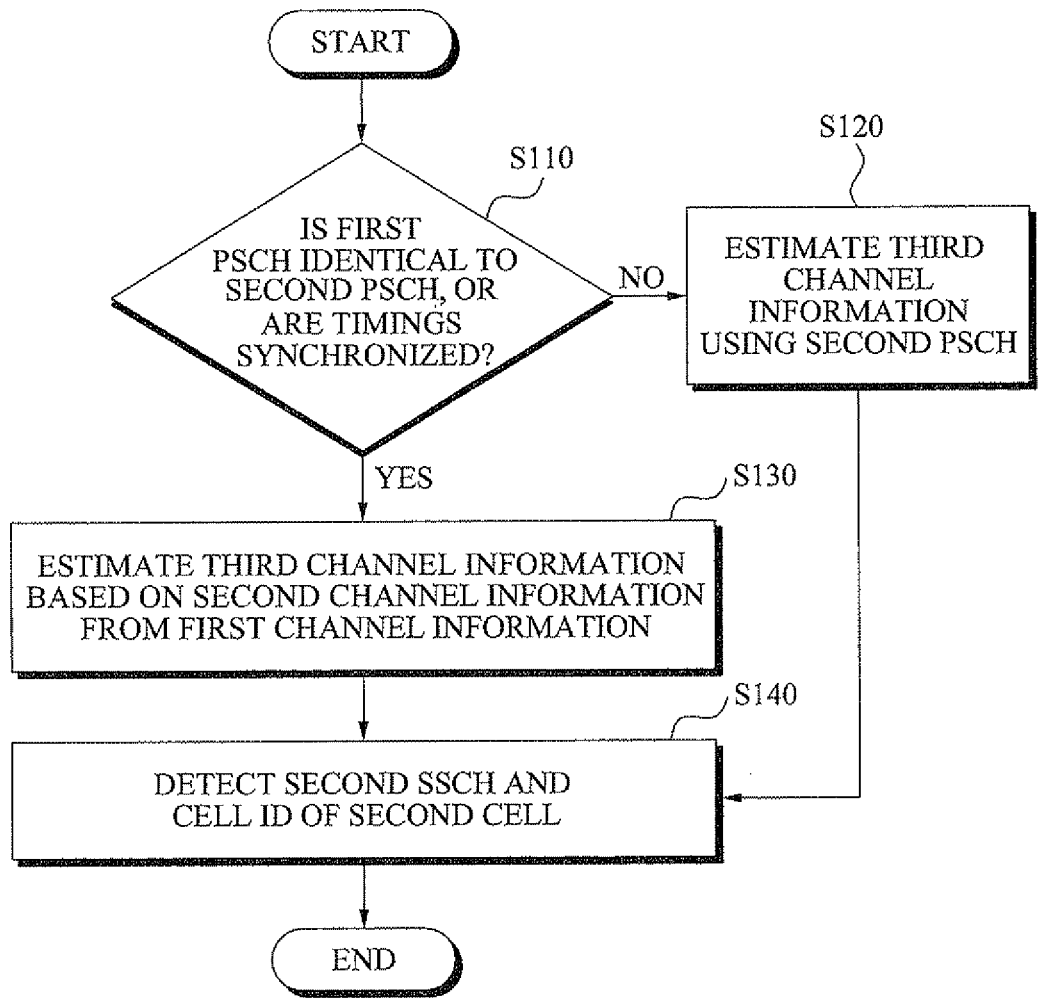
FIG. 1 is a flowchart illustrating a method of discovering a neighbor cell according to an exemplary embodiment of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top" may be used herein to describe one element's relationship to another elements as illustrated in the Figures. It will be understood that relative terms are intended to encompass different orientations of the device in addition to the orientation depicted in the Figures. For example if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Reference will now be made in more detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating a method of discovering a neighbor cell according to an exemplary embodiment of the present invention.

In operation S110, it may be determined whether a first primary synchronization channel (PSCH) of a first cell where a terminal is included is identical to a second PSCH of a second cell, and whether tings of the first cell and the second cell are synchronous.

In operation S110, a correlation of the first PSCH and the second PSCH with at least one predetermined PSCH may be performed. Also, when a first peak value and a second peak value are calculated from a same PSCH sequence as a result of the correlation, it may be determined that the first PSCH is identical to the second PSCH.

In operation S110, it may be determined that the timings of the first cell and the second cell are synchronous, when a distance between the first PSCH and the second PSCH is within a Cyclic Prefix (CP) interval.

When it may be determined that the first PSCH is different from the second PSCH or the timings of the first cell and the second cell are asynchronous in operation S110, third channel information of the second cell may be estimated using the second PSCH in operation S120.

However, when it may be determined that the first PSCH is identical to the second PSCH and the timings of the first cell and the second cell are synchronous in operation S110, the third channel information of the second cell may be estimated based on second channel information of the first cell from first channel information in operation S130. The second channel information of the first cell may be estimated using a first secondary synchronization channel (SSCH) of the first cell. The first channel information may be estimated using the first PSCH and the second PSCH.

In operation S140, a second SSCH of the second cell may be detected using the third channel information, and a cell identifier (ID) of the second cell may be detected using the second SSCH.

In operation S130, a first channel coefficient associated with the first channel information may be estimated, and a second channel coefficient associated with the second channel information may be estimated. Sequentially, in operation S130, a third channel coefficient associated with the third channel information may be estimated using a difference between the first channel coefficient and the second channel coefficient.

In operation S140, the second SSCH of the second cell may be detected using the third channel coefficient.

Also, in operation S140, the cell ID of the second cell may be detected from a third peak value which is calculated based on a correlation of the second SSCH with at least one predetermined SSCH.

Hereinafter, the method of discovering a neighbor cell is described in detail with reference to FIG. 2.

Figure 2:
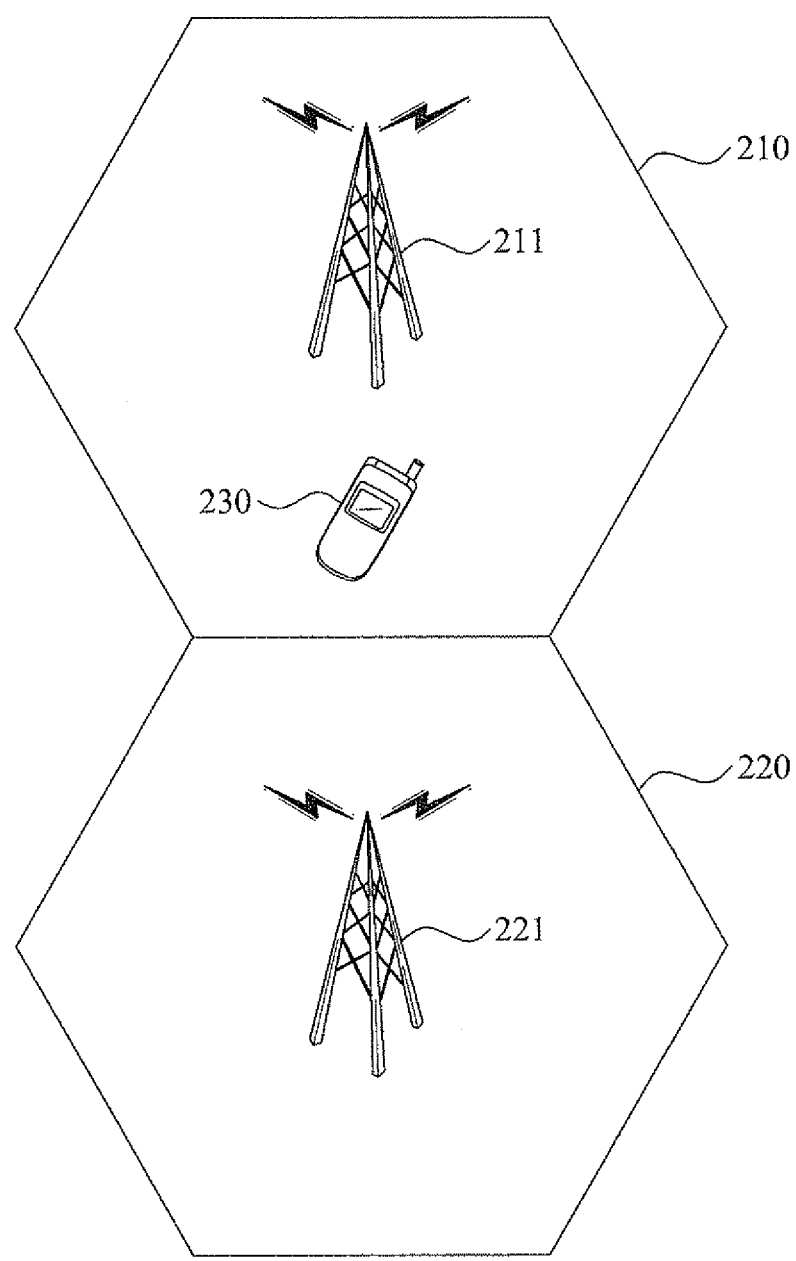
FIG. 2 is a diagram illustrating a communication system of discovering a neighbor cell according to an exemplary embodiment of the present invention.

FIG. 2 is a diagram illustrating a communication system according to an exemplary embodiment of the present invention.

A first cell 210, a second cell 220, a first base station 211, a second base station 221, and a terminal 230 are illustrated in FIG. 2.

It may be assumed that the terminal 230 is included in the first cell 210, the first base station 211 is a service station, and the second cell 220 is a neighbor cell which is to be retrieved by the terminal 230.

In general, the terminal 230, included in the first cell 210, may estimate third channel information of the second cell 220 by detecting a second PSCH of the second cell 220 to retrieve the second cell 220. Also, the terminal 230 may compensate the third channel information, and estimate a second SSCH sequence which is actually transmitted by the second base station 221.

Sequentially, the terminal 230 may detect an SSCH sequence having a peak value from among at least one predetermined SSCH sequence based on a correlation of the second SSCH sequence with the at least one predetermined SSCH sequence. Also, the terminal 230 may detect a cell ID of the second cell 220 using the detected SSCH sequence.

However, when a first PSCH of the first cell 210 and a second PSCH of the second cell 220 are identical, timings of the first cell 210 and the second cell 220 are synchronous, and the terminal 230 desires to estimate the third channel information using the PSCH, a noise may occur due to the first PSCH. Accordingly, a probability that the terminal 230 retrieves the second cell 220 may be significantly reduced.

Accordingly, when the first PSCH is identical to the second PSCH, and the timings of the first cell 210 and the second cell 220 are synchronous, a method of discovering a neighbor cell according to an exemplary embodiment of the present invention may estimate the third channel information by removing second channel information of the first cell 210 from first channel information. The first channel information may be estimated using the first PSCH and the second PSCH.

Accordingly, the noise due to the first PSCH may be reduced and the probability that the terminal 230 retrieves the second cell 220 may increase.

The method of discovering a neighbor cell is described in greater detail with reference to FIG. 1. In operation S110, it may be determined whether the first PSCH is identical to the second PSCH, and whether the timings of the first cell 210 and the second cell 220 are synchronous.

In operation S110, it may be determined whether the first PSCH is identical to the second PSCH depending on a result of determining whether a first peak value and a second peak value are calculated from a same PSCH sequence based on a result of a correlation of the first PSCH and the second PSCH with at least one predetermined PSCH.

The first PSCH may be transmitted from the first base station 211 to the terminal 230, and the second PSCH may be transmitted from the second base station 221 to the terminal 230. Accordingly, the first peak value and the second peak value may be detected, while the correlation of the received PSCHs, received by the terminal 230, with the at least one PSCH to retrieve the second cell 220 are performed.

Accordingly, the method of discovering a neighbor cell may determine whether the first PSCH is identical to the second PSCH depending on the result of determining S whether the first peak value and the second peak value are calculated from the same PSCH sequence.

In operation S220, when the first peak value and the second peak value are calculated from the same PSCH sequence, it may be determined whether a distance between the first peak value and the second peak value is within a CP interval. When the distance between the first peak value and the second peak value is within the CP interval, it may be determined that the timings of the first cell 210 and the second cell 220 are synchronous.

When the first PSCH is different from the second PSCH or the timings of the first cell 210 and the second cell 220 are asynchronous as a result of the determination in operation S110, the third channel information may be estimated using the second PSCH in operation S120.

In operation S140, the second SSCH may be detected using the third channel information and the cell ID of the second cell 220 may be detected using the second SSCH.

In operation S140, the cell ID of the second cell 220 may be detected from a third peak value which is calculated based on a correlation of the second SSCH with at least one predetermined SSCH.

That is, when the first PSCH is different from the second PSCH, or the timings of the first cell 210 and the second cell 220 are asynchronous, the terminal 230 may detect only the second PSCH without being affected by the first PSCH. Accordingly, the third channel information may be estimated using the second PSCH, and be compensated. Also, the second SSCH may be detected using the third channel information. Therefore, the cell ID of the second cell 220 may be detected from the third peak value calculated based on the correlation of the second SSCH with the at least one predetermined SSCH.

However, when the first PSCH is identical to the second PSCH, and the timings of the first cell 210 and the second cell 220 are synchronous as the result of the determination in operation S110, the third channel information of the second cell 220 may be estimated based on the second channel information of the first cell 210 from the first channel information. The second channel information of the first cell 210 may be estimated using the first SSCH. The first channel information may be estimated using the first PSCH and the second PSCH.

In operation S130, a first channel coefficient associated with the first channel information may be estimated, and a second channel coefficient associated with the second channel information may be estimated. Also, a third channel coefficient associated with the third channel information may be estimated using a difference between the first channel coefficient and the second channel coefficient.

In this instance, the first channel coefficient may be represented as, $$\hat{H}(k) = H_h(k) + H_t(k) + \epsilon(k) \qquad \text{[Equation 1]}$$

where $H_h(k)$ may denote a channel of the first cell 210, and $H_t(k)$ may denote a channel response value for a sub-carrier k of the second cell 220. Also, $\epsilon(k)$ may denote a channel estimation error value.

Also, the second channel coefficient may be estimated using Equation 2 given as below.

$$\hat{H}_h(k) = S^*_h(k) X(k) \otimes W(k), \qquad \text{[Equation 2]}$$

where $\otimes$ and $S_h(k)$ may denote a convolution and a first SSCH sequence of the first cell 210, respectively. Also, $W(k)$ may denote a smoothing function. An Inverse Fast Fourier Transform (IFFT) may be performed with respect to the first channel coefficient to shift to a time region, and a Fast Fourier Transform (FFT) may be performed with respect to only valid samples. Accordingly, a channel estimation performance may be improved. Also, X(k) denoting an SSCH symbol received by the terminal 210 may be represented as, $$X(k)=H_h(k)S_h(k)+H_t(k)S_t(k)+v(k). \quad \text{[Equation 3]}$$

Here, $S_t(k)$ may denote a second SSCH sequence of the second cell 220, and v(k) may denote a Gaussian noise.

Since the first PSCH is identical to the second PSCH, and the timings of the first cell 210 and the second cell 220 are synchronous, the SSCH symbol received by the terminal 230 may include the first SSCH sequence and the second SSCH sequence as Equation 3.

In general, the terminal 230 may estimate the third channel coefficient from the SSCH symbol shown in Equation 3, which may be represented as, $$Y_t = \sum_k S_t^*(k)\hat{H}^*(k)X(k). \quad \text{[Equation 4]}$$

In Equation 4, it may be ascertained that the first channel coefficient shown in Equation 1 is used to estimate the third channel coefficient. However, since the first channel coefficient includes channel information about the first cell 210, a noise may be significantly included in the third channel coefficient estimated by Equation 4.

Accordingly, the method of discovering a neighbor cell may estimate the third channel coefficient using a difference between the first channel coefficient and the second channel coefficient, and thus a noise due to the first cell 210 may be minimized.

That is, the third channel coefficient may be estimated by, $$\tilde{Y}_t = \sum_k S_t^*(k)\left(\hat{H}(k) - \hat{H}_k(k)\right)^* X(k). \quad \text{[Equation 5]}$$

That is, as shown in Equation 5, the third channel coefficient may be estimated using the difference between the first channel coefficient shown in Equation 1 and the second channel coefficient estimated by Equation 2. Accordingly, an effect of the first cell 210 when the terminal 230 retrieves the second cell 220 may be minimized.

When the third channel information is estimated in operation S130, the second SSCH may be detected using the third channel information, and the cell ID of the second cell 220 may be detected using the second SSCH in operation S140.

In operation S130, the cell ID of the second cell 220 may be detected from a third peak value which is calculated based on a correlation of the second SSCH with at least one predetermined SSCH.

The method of discovering a neighbor cell according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 3:
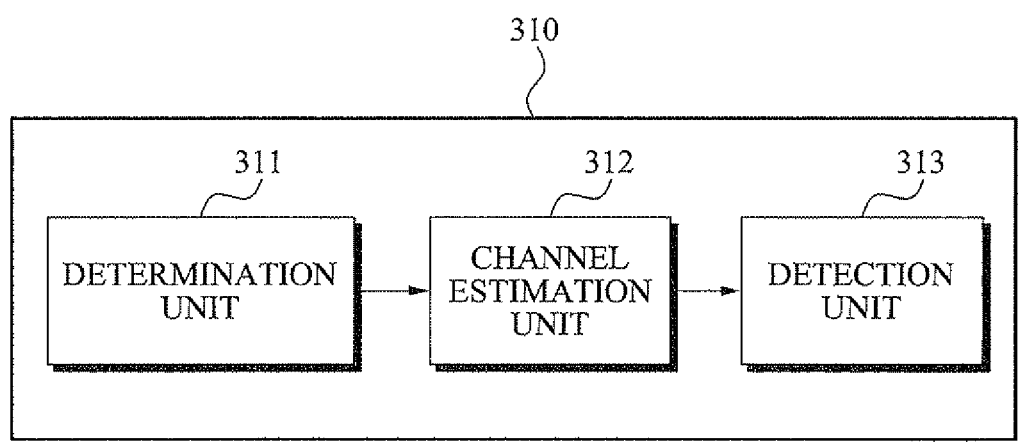
FIG. 3 is a diagram illustrating a configuration of an apparatus of discovering a neighbor cell according to an exemplary embodiment of the present invention.

FIG. 3 is a diagram illustrating a configuration of an apparatus 310 of discovering a neighbor cell according to an exemplary embodiment of the present invention.

The apparatus 310 of discovering a neighbor cell may include a determination unit 311, a channel estimation unit 312, and a detection unit 313.

The determination unit 311 may determine whether a first PSCH of a first cell in which a terminal is included is identical to a second PSCH of a second cell, and whether timings of the first cell and the second cell are synchronous.

The determination unit 311 may determine whether a first peak value and a second peak value are calculated from a same PSCH sequence. In this instance, the first peak value and the second peak value may be calculated based on a correlation of the first PSCH and the second PSCH with at least one predetermined PSCH. When the first peak value and the second peak value are calculated from the same PSCH sequence, the determination unit 311 may determine that the first PSCH is identical to the second PSCH.

In this instance, the determination unit 311 may determine whether a distance between the first peak value and the second peak value is within a CP interval. When the distance between the first peak value and the second peak value is within the CP interval, the determination unit 311 may determine that the timings of the first cell and the second cell are synchronous.

When the determination unit 311 determines that the first PSCH is different from the second PSCH and the timings of the first cell and the second cell are asynchronous, the channel estimation unit 312 may estimate third channel information of the second cell using the second PSCH.

However, when the determination unit 311 determines that the first PSCH is identical to the second PSCH and the timings of the first cell and the second cell are synchronous, the channel estimation unit 312 may estimate the third channel information based on second channel information of the first cell from first channel information. In this instance, the second channel information may be estimated using a first SSCH of the first cell, and the first channel information may be estimated using the first PSCH and the second PSCH.

In this instance, the channel estimation unit 312 may estimate a first channel coefficient associated with the first channel information, and a second channel coefficient associated with the second channel information. Also, the channel estimation unit 312 may estimate a third channel coefficient, associated with the third channel information, using a difference between the first channel coefficient and the second channel coefficient.

In this instance, according to an exemplary embodiment of the present invention, the first channel coefficient may be represented as Equation 1.

Also, according to an exemplary embodiment of the present invention, the second channel coefficient may be estimated using Equation 2.

Also, according to an exemplary embodiment of the present invention, the third channel coefficient may be estimated using Equation 5.

The detection unit 313 may detect a second SSCH of the second cell using the third channel information, and detect a cell ID of the second cell using the second SSCH.

The detection unit 313 may detect the cell ID of the second cell from a third peak value calculated based on a correlation of the second SSCH with at least one predetermined SSCH.

Although a few exemplary embodiments of the present invention have been shown and described, the present invention is not limited to the described exemplary embodiments. Instead, it would be appreciated by those of ordinary skill in the art that changes may be made to these exemplary embodiments without departing from the principles and spirit of the present invention, the scope of which is defined by the claims and their equivalents.

What is claimed is:

1. A method of discovering a neighbor cell by a terminal, the method comprising:
   determining whether a first Primary Synchronization Channel (PSCH) of a first cell in which the terminal is included is identical to a second PSCH of a second cell, and whether timings of the first cell and the second cell are synchronous, wherein the first cell is serviced by a first base station and the second cell is serviced by a second base station, and wherein the terminal receives the first PSCH from the first base station and receives the second PSCH from the second base station;
   estimating third channel information of the second cell based on subtracting second channel information of the first cell from first channel information, when the first PSCH is identical to the second PSCH and the timings of the first cell and the second cell are synchronous, the second channel information being estimated using a first Secondary Synchronization Channel (SSCH) of the first cell, and the first channel information being estimated using the first PSCH and the second PSCH; and
   detecting a second SSCH of the second cell using the third channel information, wherein the second SSCH of the second cell is different than the first SSCH of the first cell, and detecting a cell identifier (ID) of the second cell using the second SSCH.

2. The method of claim 1, further comprising:
   estimating the third channel information using the second PSCH, when the first PSCH is different from the second PSCH or the timings of the first cell and the second cell are asynchronous.

3. The method of claim 1, wherein the determining of whether the timings of the first cell and the second cell are synchronous determines the first PSCH is identical to the second PSCH, when a first peak value and a second peak value are calculated from a same PSCH sequence, the first peak value and the second peak value being calculated based on a correlation of the first PSCH and the second PSCH with at least one predetermined PSCH.

4. The method of claim 3, wherein the determining of whether the timings of the first cell and the second cell are synchronous determines the timings of the first cell and the second cell are synchronous, when a distance between the first peak value and the second peak value is within a cyclic prefix interval.

5. The method of claim 1, wherein the estimating of the third channel information estimates a first channel coefficient associated with the first channel information, a second channel coefficient associated with the second channel information, and a third channel coefficient, associated with the third channel information, using a difference between the first channel coefficient and the second channel coefficient, and the detecting of the cell ID detects the second SSCH using the third channel coefficient.

6. The method of claim 1, wherein the detecting of the cell ID detects the cell ID of the second cell from a third peak value calculated based on a correlation of the second SSCH with at least one predetermined SSCH.

7. An apparatus of discovering a neighbor cell, the apparatus comprising:
   a determination unit to determine whether a first PSCH of a first cell in which a terminal is included is identical to a second PSCH of a second cell, and whether timings of the first cell and the second cell are synchronous, wherein the first cell is serviced by a first base station and the second cell is serviced by a second base station, and wherein the terminal receives the first PSCH from the first base station and receives the second PSCH from the second base station;
   a channel estimation unit to estimate third channel information of the second cell based on subtracting second channel information of the first cell from first channel information, when the first PSCH is identical to the second PSCH and the timings of the first cell and the second cell are synchronous, the second channel information being estimated using a first SSCH of the first cell, and the first channel information being estimated using the first PSCH and the second PSCH; and
   a detection unit to detect a second SSCH of the second cell using the third channel information, wherein the second SSCH of the second cell is different than the first SSCH of the first cell, and to detect a cell ID of the second cell using the second SSCH.

8. The apparatus of claim 7, wherein the channel estimation unit estimates the third channel information using the second PSCH, when the first PSCH is different from the second PSCH or the timings of the first cell and the second cell are asynchronous.

9. The apparatus of claim 7, wherein the determination unit determines the first PSCH is identical to the second PSCH, when a first peak value and a second peak value are calculated from a same PSCH sequence, the first peak value and the second peak value being calculated based on a correlation of the first PSCH and the second PSCH with at least one predetermined PSCH, and
   determines the timings of the first cell and the second cell are synchronous, when a distance between the first peak value and the second peak value is within a cyclic prefix interval.

10. The apparatus of claim 7, wherein the channel estimation unit estimates a first channel coefficient associated with the first channel information, a second channel coefficient associated with the second channel information, and a third channel coefficient, associated with the third channel information, using a difference between the first channel coefficient and the second channel coefficient, and
   the detection unit detects the second SSCH using the third channel coefficient.

11. The apparatus of claim 7, wherein the detection unit detects the cell ID of the second cell from a third peak value calculated based on a correlation of the second SSCH with at least one predetermined SSCH.

* * * * *